O. A. HOLLIS.
VEHICLE WHEEL TIRE.
APPLICATION FILED MAR. 5, 1914.
1,253,381.
Patented Jan. 15, 1918.
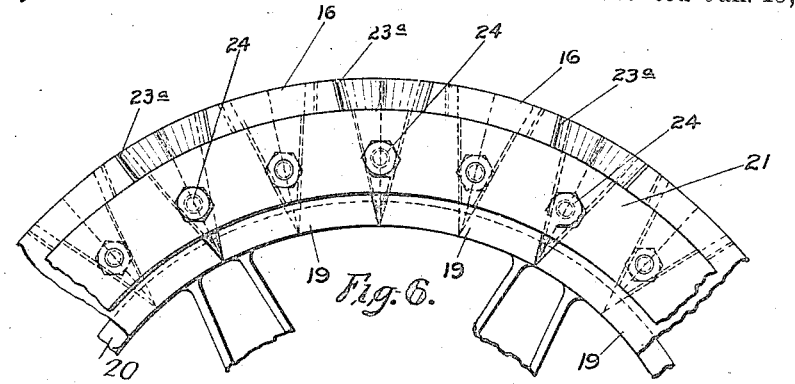
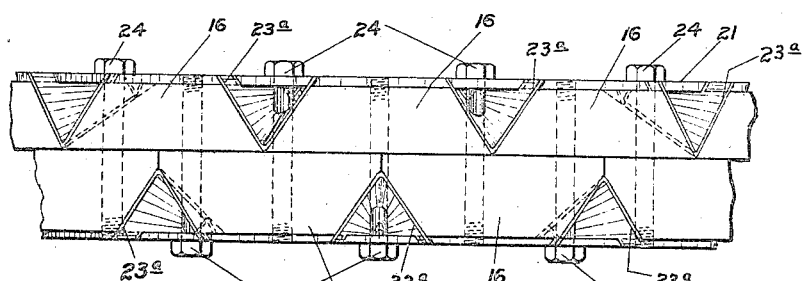
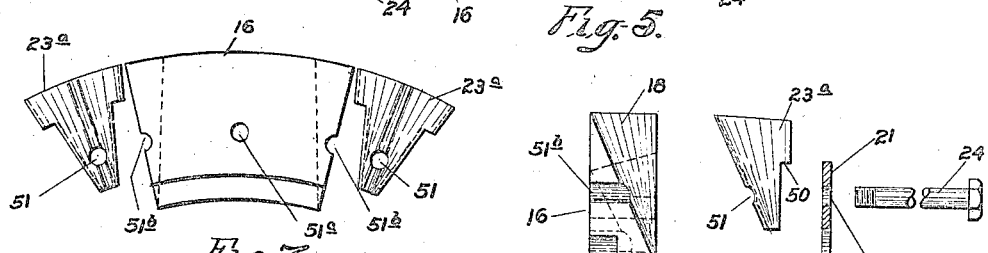
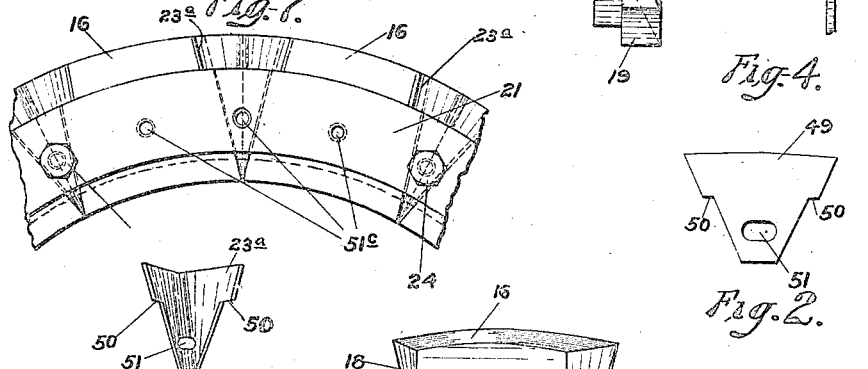
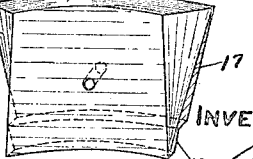
WITNESSES.
INVENTOR:

UNITED STATES PATENT OFFICE.

OTIS A. HOLLIS, OF PITTSBURGH, PENNSYLVANIA, ASSIGNOR TO HOLLIS AUTOMATIC TRACTION JACK COMPANY, OF PITTSBURGH, PENNSYLVANIA, A CORPORATION OF DELAWARE.

VEHICLE-WHEEL TIRE.

1,253,381.  Specification of Letters Patent.  Patented Jan. 15, 1918.

Application filed March 5, 1914. Serial No. 822,630.

*To all whom it may concern:*

Be it known that I, OTIS A. HOLLIS, a citizen of the United States, residing at Pittsburgh, in the State of Pennsylvania, have invented certain new and useful Improvements in Vehicle-Wheel Tires, of which the following is a specification.

In my co-pending application No. 768,764, I have illustrated and described a vehicle wheel tire made up of blocks of wood, or other material, having the general form of a sector between concentric circles, and having the outer corners on the same side of each block beveled, and having the base of each block undercut on the inside to form a flange adapted to engage the rim of the vehicle wheel. These blocks are placed with their unbeveled faces inward and overlap in two rows around the whole rim, breaking the joints by their staggered order. Their solid bases rest on the rim of the wheel, and their flanges engage the side of the rim. Against the outsides of the blocks in place metal rings are provided to hold the two series of blocks together. These rings have at intervals equal to the width of a block a pyramidal wedge-shaped lug, which fits into the space left by the adjoining beveled edges of the blocks. Bolts pass through the blocks and rings to hold the composite tire tightly together.

My invention relates to tires for vehicles designed to bear heavy loads, and its principal object is to provide a composite tire made of resilient blocks, held together in a rigid arch, having detachable wedge-shaped lugs retaining said blocks, and adapted to reinforce the tread surface of the tire.

Referring to the drawings Figure 1 shows a perspective of a wooden block as used in my tire; Fig. 2 shows a metal blank from which the finished wedge lug shown in Fig. 3 is made; Fig. 4 shows a resilient block, a wedge lug, the metal retaining ring, and a bolt, all in relative but disassociated position; Fig. 5 is a plan view of the parts shown in Fig. 4 in normal fixed position in my completed tire; Fig. 6 shows an elevation of a portion of the tire in normal position; while Fig. 7 shows the method of removing any part of my tire tread.

My present invention consists of a tire having an improved form of detachable wedge lug. The lug is made of a sheet metal blank folded to an angle, having an offset whereby the lugs rests on the retaining metal ring, and having its outer edges co-incident with the outer beveled edges of the resilient blocks. This has all of the functions of my former solid wedge lug and in addition gives a tread to my tire which is partly metal, and therefore greatly increases its durability and gripping power. Also the metal lug acts as a guard to the edges of the resilient blocks, reinforcing and protecting them from frayed edges, etc. The lug may be made of any desired thickness, or hardness of metal, so that it will wear at the same rate as the resilient blocks, and so present a constantly uniform composite tread. When worn down, new lugs may be inserted with small trouble and at little expense.

The particulars of construction and use of my invention are as follows:

I stamp from sheet metal the blank 49 shown in Fig. 2, having the bolt hole (51) and offsets 50. This is then pressed into the angle form shown in Fig. 3, which is my finished lug. Resilient blocks 16, having beveled faces 17 and 18, and being undercut on their inside face to form the exterior flange 19 resting against the side of the wheel rim 20, and having bolt holes ($51^a$) and ($51^b$) respectively at their center and through each edge, are placed edge to edge to form a circular arch. Another series of such blocks is placed beside the first, each series having its beveled faces outside. Metal rings 21 are then placed against the outer sides of the two series of blocks, as shown in Figs. 4, 5, 6 and 7. Bolts 24 pass through these rings alternately in opposite directions, as shown in Fig. 5. Each bolt passes through a hole ($51^c$) in the ring 21, the hole (51) in a lug $23^a$, a hole ($51^a$) in the center of a block 16, and through a hole ($51^b$) in the edges of two of the blocks. The bolt holes ($51^c$) in the metal rings are alternately threaded, as shown in Fig. 5.

The lug $23^a$ seats, by offsets 50, on the ring 21. When all the parts are in normal position, as shown in Figs. 5 and 6, and the bolts 24 are screwed up tight, the wedge $23^a$ will exert a resultant pressure on blocks 16 in three directions, viz. inward, face against face, downward, toward the hub of the wheel, forcing blocks 16 against rim 20, and compression of the block 16 from the beveled edges 17 and 18. Thus each block 16 is under pressure from each of its four lateral faces, from the part of its base resting on rim 20, and, when the load rests on it, from its tread surface.

The lug 23$^a$ reinforces the beveled edges 17 and 18, and greatly lengthens the life of the wooden block by preventing the fraying of its edges. The beveled edges cannot wear faster than the metal lug 23$^a$. The lug is strong, even when made very thin, because pressure is exerted only on the flat sides of what is in effect a pyramid, and its resistance is on the arch principle. When either the lugs 23$^a$ or blocks 16 wear low, or break, any or all of them may be removed, and new ones inserted.

As shown in Fig. 7, by removing three consecutive bolts, any block and the two contiguous lugs may be removed, and no other bolts, blocks or lugs need be removed. In the figure, three bolts have been withdrawn, leaving two lugs free, these have been raised, and the block between is shown lifted. The lugs and block are from the far side of the tire.

It will be observed that in Fig. 5 I have shown the near series of blocks as thicker than the far series. The thinner series goes next the vehicle body. By the use of thicker blocks on the outside of my tire I may broaden the tread thereof without bringing the tire nearer to the vehicle body, and without change of wheels, i. e., the extension is unsymmetrical with respect to the rim of the wheel, and is away from the vehicle body. The tire as composed by me will stand considerable extension of this kind, since the block is seated on its inner interior edge, and is securely clamped on its extension face and beveled edges.

While I have mentioned wooden blocks 16 throughout, it is to be understood that I contemplate the use of blocks of other material, such as fiber, rubber, etc. Where wooden blocks are used it is necessary that they be cut so that the grain runs radially, as will be understood.

Having thus described and illustrated my invention, I claim:

1. A wearing tire for tractor vehicles comprising the combination with the wheel rim, of a circumferential series of non-metallic blocks beveled so as to form triangular pyramidal recesses between each pair of blocks, and retaining means including resilient wedges engaging said blocks to tighten them on the rim both vertically and circumferentially.

2. A wooden tire tread for tractor vehicles comprising a circumferential series of blocks with beveled corners, and proper retaining means including resilient metal wedges engaging the recesses in the blocks and lying flush with the outer or wearing surface of the blocks, whereby to form extra gripping means for the tire tread.

3. A vehicle wheel tire composed of resilient blocks placed on the rim of the wheel, said blocks having their lateral corners beveled to form pyramidal recesses between adjacent blocks, laterally placed metal rings retaining said blocks, and pyramidal metal wedges attached to the rings adapted to fit into said recesses to exert pressure on the blocks laterally, circumferentially, and vertically, substantially as described.

4. In a vehicle tire, the combination with a wheel rim and a series of non-metallic blocks having diagonally beveled corners forming pyramidal recesses between adjacent blocks, of a retaining device consisting of a pyramidal metal wedge fitting between the beveled corners of the blocks and flush with the outer surfaces thereof, and laterally placed rings held against said blocks and wedges.

5. A vehicle wheel tire tread composed of resilient blocks having diagonally beveled corners, resilient metal wedges engaging the recesses formed by said diagonal corners, and retaining rings fixed under pressure against the lateral sides of said wedges whereby to resiliently compress the resilient blocks in several directions, substantially as described.

6. A vehicle wheel tire composed of resilient blocks having diagonally beveled corners, a pair of laterally placed rings retaining said blocks on the wheel rim, and a series of detachable resilient metal wedges in the form of triangular pyramids held by said rings in the recesses formed by the bevels on the blocks, said blocks having an undercut portion so as to rest on the wheel rim and project along the lateral sides thereof.

7. A vehicle wheel tire composed of two series of wooden blocks fitting together to form complete arches, the outer corners of the blocks being beveled to form pyramidal lateral recesses between adjacent blocks of the series, the same being held in place by lateral clamping rings, and a series of triangular pyramidal wedges attached to the rings and engaging said lateral recesses.

8. A vehicle wheel tire comprising two series of resilient tread blocks having beveled outer corners forming pyramidal lateral recesses between adjacent blocks, one series of blocks being broader laterally than the other series, whereby the tread is unsymmetrical with respect to the plane of the wheel, and retaining rings having pyramidal wedge lugs engaging said recesses.

9. In a vehicle tire tread, the combination with the wheel rim, of a pair of laterally placed metal rings, a series of resilient blocks retained between said rings and having their outer corners angularly beveled, detachable resilient metal wedges attached to said rings and fitting in the beveled recesses of the blocks, substantially as described.

In testimony whereof I have hereunto signed my name in the presence of the two subscribed witnesses.

OTIS A. HOLLIS.

Witnesses:
Jo. BAILY BROWN,
FREDK. STAUB.

Copies of this patent may be obtained for five cents each, by addressing the "Commissioner of Patents, Washington, D. C."